United States Patent [19]

Gauronski et al.

[11] 4,132,401
[45] Jan. 2, 1979

[54] COPIER DOCUMENT SENSING AND CONTROL SYSTEM

[75] Inventors: John F. Gauronski; Thomas A. Havel, both of Rochester, N.Y.

[73] Assignee: Xerox Corporation, Stamford, Conn.

[21] Appl. No.: 801,114

[22] Filed: May 27, 1977

[51] Int. Cl.² ............................................. B65H 9/04
[52] U.S. Cl. ................................... 271/245; 271/259; 271/265
[58] Field of Search ................ 271/10, 228, 234, 243, 271/244, 258, 259, 261, 265, 246, 247, 261

[56] References Cited

U.S. PATENT DOCUMENTS

| | | | |
|---|---|---|---|
| 3,310,304 | 3/1967 | Foias | 271/265 X |
| 3,674,363 | 7/1972 | Ballen | 271/265 X |
| 3,970,384 | 7/1976 | Yamamoto | 271/259 X |

*Primary Examiner*—Richard A. Schacher

[57] ABSTRACT

A document sensing and control system for a document handling system for feeding documents across the imaging station of a copier. At a document input area two document sensors are centrally positioned respectively at the upstream and downstream sides of a pre-registration gate to sense the presence or absence of documents to control the document handling system in a desired manner during its operating cycle. Protection is provided, without requiring additional sensors, against improper insertion of documents into the document handling unit, over or under sized documents, document misfeeding, and lifting of the document handling unit away from the platen.

13 Claims, 3 Drawing Figures

COPIER DOCUMENT SENSING AND CONTROL SYSTEM

For the faster xerographic and other document copiers now in commercial use, it is increasingly desirable to provide for automatic handling of the individual original documents being copied in order to utilize those higher speed copying capabilities. However, such documents can vary widely in sheet size, weight, thickness, material, condition, humidity, age, and value. The documents may have curls, wrinkles, tears, "dog-ears," cutouts, overlays, paste-ups, tape, staples, adhesive areas, or other defects. Yet it is desirable to be able to semi-automatically or automatically copy a set of documents with a mixture of sizes, types, and conditions, without document jams or document damage. Further, it is desirable to handle such documents with a relatively compact and inexpensive document handling system. Preferably the document handling system is one which may be placed over an existing or conventional external transparent copying platen (window) of a copier, and which can utilize the same existing or conventional optics system. That is, it is desirable that the automatic document handling system be readily removable from the platen area by the copier operator whenever desired to allow conventional manual copying of documents, such as books, on the same copying platen.

The present invention relates to a document sensing and control system for overcoming various of the above-stated problems, including improved protection against document damage and document jams in the initial feeding of documents into the document handling system.

The system disclosed herein is suitable for, and compatable with, a simple and low cost document handling system usable with conventional copier platens and optics systems as a removable or auxiliary document handling system generally overlying an existing or conventional platen to selectively allow use of that same platen and its associated optics for manual copying. However, the invention is not limited thereto.

The present invention is particularly suitable for use in a document handling system of the type disclosed in further detail in U.S. Pat. No. 4,043,665 filed Mar. 26, 1975, by John R. Caldwell, as well as in the present specification. Accordingly, that patent is specifically incorporated by reference herein. Certain aspects of the present system were incidentally disclosed by the present inventors, but not claimed, in that patent, as will be further noted herein.

STATEMENT OF ART

As previously indicated, the present invention is particularly related to U.S. Pat. No. 4,043,665 filed Mar. 26, 1975, by John R. Caldwell, with the same assignee, in Art Unit 211, and relevant portions of that application are incorporated herein.

A preferred example of a copier control system and circuitry in which the subject control system disclosed herein may be incorporated is described in U.S. Pat. No. 3,936,182, issued Feb. 3, 1976, to Sikander Sheikh. Accordingly, that patent is also incorporated herein. While integral incorporation into the copier's general logic circuitry and software, as in that patent, is preferred, a schematic circuit is provided here in FIG. 3 to provide a clearer understanding of the invention and another suitable embodiment.

It is known to actuate a document handling system and its associated copier automatically in response to the insertion of the lead edge of a document into a switch at the input of the document handling system, as disclosed in said above-cited Caldwell patent, or in U.S. Pat. No. 3,099,943, issued Aug. 6, 1963, to R. H. Eichorn, et al. (e.g., Col. 23), or U.S. Pat. No. 3,815,990, issued June 11, 1974, to H. M. Newcomb, et al. (note especially switch 183 in FIG. 17).

It is also known to provide a registration gate for a document at the input station of a document handling system as disclosed in Caldwell and in U.S. Pat. No. 3,536,320, issued Oct. 27, 1970, to D. R. Derby. U.S. Pat. No. 3,910,570, issued Oct. 7, 1975, to C. D. Bleau teaches a document feeder with document gates and associated document switches.

U.S. Pat. No. 3,473,035, issued Oct. 14, 1969, to J. F. Gardner, et al., discloses two document photocell sensors PC3 and PC4 for detecting a document through a document transport belt at a document imaging area for controlling the movement of the document belt (see especially Col. 8).

Two document sensors for sensing the lead edge position of a document being inserted in a document handler are utilized in the IBM Corporation "Copier III" copier. However, the feeding of the document past the document entry gate is controlled by the second sensor sensing the corner of the document, and both sensors must be actuated to initiate feeding of the document for copying. A timed jam detection function is also provided utilizing one of the document entry sensors. IBM Technical Disclosure Bulletin, Vol. 19, No. 5, October 1976, pp. 1589–91 appears to describe that system, and thus is of particular interest.

It is well known to utilize photocell or other jam detectors for copy sheets in a copier in which the edge of the sheet starts a timing circuit actuated by a sheet sensor, and in which, if that or a subsequent document does not pass that or a subsequent sheet sensor in the copier within a pre-set time period, a jam condition is sensed and utilized to shut down the copier.

Other examples of jam detectors and/or registration systems utilizing document sensors in document feeders, in addition to those noted above, are disclosed in U.S. Pat. Nos. 3,556,511, issued Jan. 19, 1971, to A. Howard, et al.; 3,674,363, issued July 4, 1972, to E. O. Baller, et al.; 3,790,158, issued Feb. 5, 1974, to J. E. Summers, et al.; 3,819,266, issued June 25, 1974, to H. C. Price; and U.S. Patent Office Defensive Disclosure T957,006, published in the Official Gazette, Vol. 957, No. 1, p. 2, on Apr. 5, 1977, identified as based on application Ser. No. 671,865.

While a semi-automatic, manually fed, document handling system is disclosed herein, the invention is not limited thereto. The documents may be loaded automatically and/or copied in an automatic document recirculation precollation copying system.

An exemplary embodiment of the present invention is shown and described hereinbelow as incorporated into an otherwise conventional exemplary xerographic apparatus and process. Accordingly, said xerographic apparatus and process itself need not be described herein, since various publications, patents, and known apparatus are available to teach details thereof to those skilled in the art. For example, examples of known stationary document scanning type optics systems, moving document fixed optics systems, flash illumination full frame exposure optics systems, and variable magnification systems therefor are all disclosed in various patents for imaging documents in copier systems, including those cited above. The present invention is adaptable to various such document imaging systems. Various structures and teachings from these and all of the other patents cited may be incorporated by reference in this specification to the extent appropriate.

BRIEF DESCRIPTION OF THE DRAWINGS

Further objects, features and advantages of the present invention pertain to the particular apparatus and steps whereby the above-mentioned aspects of the invention are attained. Accordingly, the invention will be better understood by reference to the following description, and to the drawings forming a part thereof, which are generally approximately to scale, and wherein.

DETAILED DESCRIPTION OF THE PREFERRED EMBODIMENT

Figure 1:
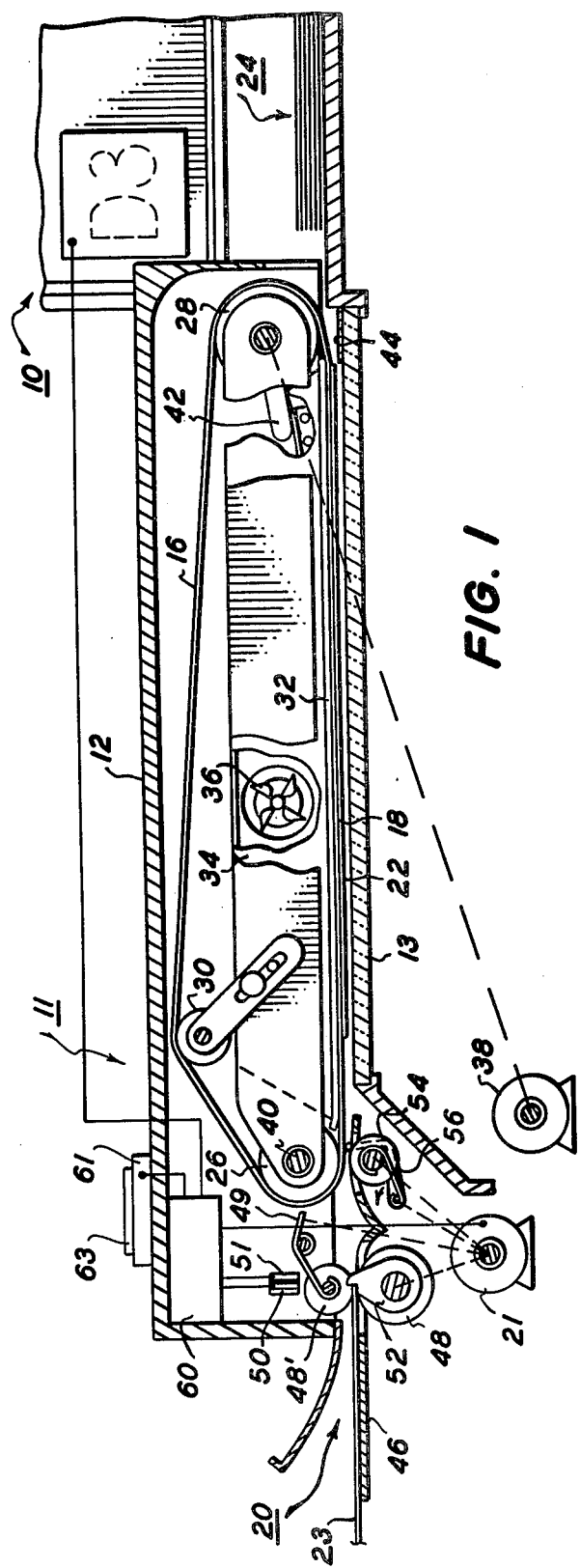
FIG. 1 is a side view of an exemplary document handling system in accordance with the present invention, in a conventional xerographic copying apparatus.
Figure 2:
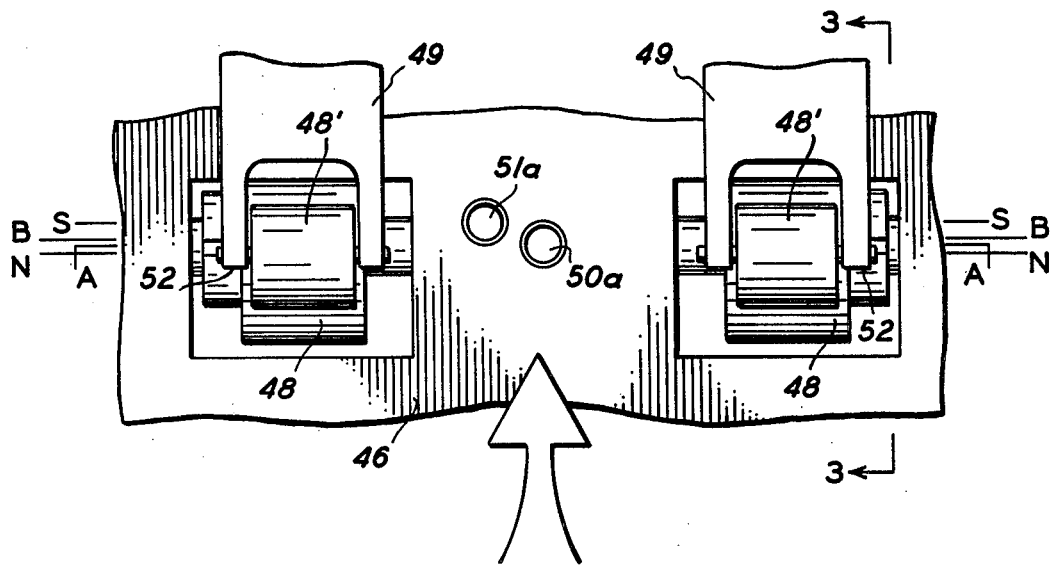
FIG. 2 is a partial enlarged top view of the pre-registration area of the document handling system embodiment of FIG. 1, with the cover and sensors removed for clarity.
Figure 3:
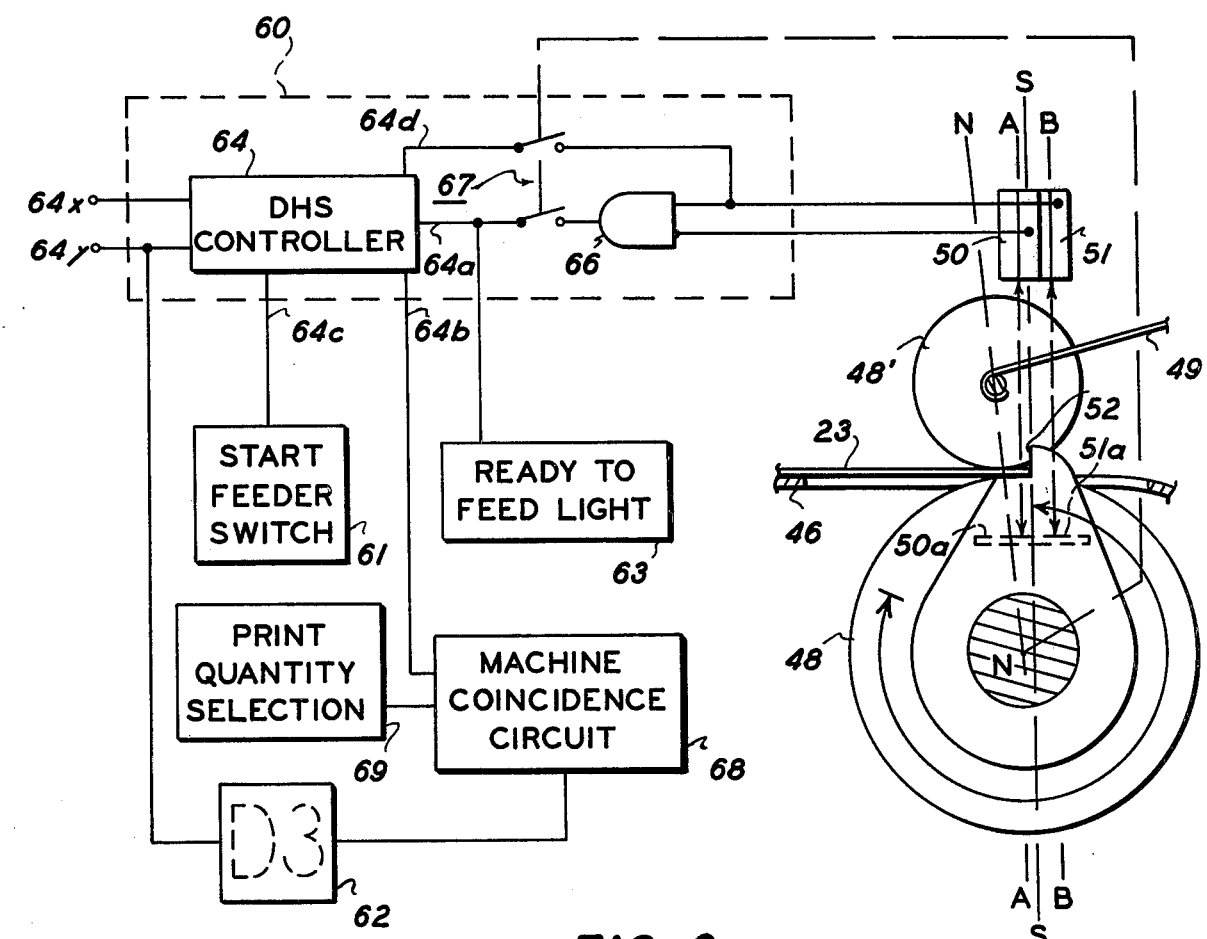
FIG. 3 is a partial enlarged cross-section side view taken along the line 3—3 of FIG. 2, and schematically illustrating exemplary circuitry connecting therewith.

FIGS. 1 through 3 illustrate one example of the present invention. It will be appreciated that the subject document handling system may have many other different orientations and structures and different combinations with different exemplary xerographic or other copying systems.

Considering now the overall document handling system 11 disclosed in the incorporated U.S. Pat. No. 4,043,655 by John R. Caldwell, reference will first be made particularly to FIG. 1. The document handling system 11 there is an integral component of a removable platen cover unit 12 on the copying apparatus 10. Documents to be copied are transported by the document handling system 11 over the platen 13 on an endless vacuum belt 16, which transports and supports the document slightly above the upper surface of the platen 13. The documents are held, without slippage, on the planar lower flight 18 of the belt 16 over the platen 13.

Documents are fed into the document handling system 11 at the in-feeding station 20 thereof, upstream from the platen in the direction of document movement. The in-feeding station 20 will be described in further detail herein, as that is the area particularly shown in FIGS. 2 and 3. Briefly, the in-feeding station 20 is adapted to receive and pre-register documents fed into the document handling system 11, and to enable the document handling system 11 for the immediately subsequent transport of each pre-registered document by the vacuum belt 16 over the platen for copying. A document 22 is shown here in its registered, over the platen, copying position, while simultaneously, a next document 23 is shown in its pre-registered position at the in-feeding station 20 immediately prior to actuation of the document handling system 11.

As soon as the copying of the registered document 22 is completed, the vacuum belt 16 is incrementally advanced to eject the document 22 out onto the output stack 24. Meanwhile, the other document 23 will have been advanced into engagement with the document belt 16 so that it may be simultaneously fed on to the platen by the vacuum belt 16 at the same time as the preceeding document 22 is being ejected therefrom, as further described in the incorporated Caldwell patent. The incremental advancement of the endless vacuum belt 16 is accomplished through a motor 38 actuated by the machine logic in response to the readiness of the other machine components and appropriate sensing and logic signals from the input station 20 as will be further described herein.

Briefly describing the integral belt mounting unit for the vacuum belt 16, it includes here an upstream support roller 26, a downstream support roller 28, and a tensioning roller 30, around which the belt 16 is wrapped. The planar configuration and alignment of the lower belt flight 18 is maintained by an overlying apertured vacuum plate 32, which supplies vacuum to the apertured belt 16 from an overlying vacuum chamber 34 evacuated by a vacuum fan unit 36. For the ejection of the document 22 from the downstream end of the vacuum belt 16, the belt mounting unit pivots up about the axis 40 of the upstream support rollers 26 by a lift cam 42 connecting with motor 38. This provides increased clearance of the downstream end of the belt 16 over a manual registration edge 44 at the downstream side of the platen, and lifts the ejected document for its placement on top of the stack 24. The stripping of documents from the vacuum belt 16 at the downstream support roller 28 is preferably assisted as disclosed in U.S. Pat. No. 4,043,665 filed Nov. 17, 1975, by P. T. Ferrari.

Describing now in further detail the in-feeding station 20, as disclosed in FIG. 1, as well as in the enlarged views of FIG. 2 and FIG. 3, a document 23 is fed into the document handling system 11 slidably on a sheet guide or baffle 46. As illustrated here, this system is suitable for manual individual placement of the document 23 in the document handling system. This may be referred to as stream feeding, or semi-automatic document handling. However, as noted, the series of documents being fed into the in-feeding station 20 may be from a fully automatic feeder/separator unit, in which the documents are fed automatically from the top or bottom of an input stack of documents. Where document recirculation is provided, this input stack may be the output stack 24 appropriately located for recirculation.

Considering further the operation of the in-feeding station 20, referring particularly to FIGS. 2 and 3, the document 23 may be initially fed in until its lead edge is engaged and stopped by a document gate comprising pre-registration gates 52. The gates 52 have a spaced pair of fingers normally extending into the document path to define a stop line "S" transverse the desired direction of document movement. They provide a pre-alignment or initial skew correction for the document if it is an acceptable document and if it is properly fed into substantially full engagement with both pre-registration gates 52. However, the present system is adapted to accept a document with predetermined, limited, initial skew or mis-registration and to provide subsequent correction of that limited skew or mis-registration, as will be further described herein.

The pair of registration gates 52 are integrally and concentrically mounted on a common shaft to a correspondingly spaced pair of pre-registration rollers 48. The rollers 48 are adapted to provide the initial feed-in of the document into the document handling system after pre-registration in cooperation with a mating pair of idler pinch rollers 48'. The pinch rollers 48' are each mounted to a pivotable arm 49 providing movement of the pinch rollers 48' into and out of engagement with the roller 48 at a nip line "N" at the appropriate time.

During the initial pre-registration in-feeding of the document 23 the nips N between the rollers 48 and 48' is open to permit the document to be freely slidably insertable up against the pre-registration gates 52, and slidably centered thereto. After the sensing and control system herein indicates that a document has been effectively (sufficiently) pre-registered, as will be further described, the pinch rollers 48' are automatically lowered onto the document to pinch the lead edge area of the pre-registered document against the rollers 48 along the nip line N. The nip line N is substantially upstream of the pre-registration gate stop line S, as shown in FIGS. 2 and 3. This spacing is such as to insure that both rollers 48 positively engage the document 23 for driving movement thereof without skew or slippage once pre-registration has been effected.

As indicated in FIG. 1, all the document feeding elements of the in-feeding station 20 may be commonly driven from a drive motor 21. This may be by appropriate cams through conventional sector gears, push rods, and other conventional sheet registration system drive mechanical components.

Once pre-registration has been effected, the document sensors 50 and 51 and their connecting circuitry allow the actuation of the document handling system, and in particular the in-feeding station drive 21, to rotate the pre-registration gates 52 and the connecting pre-registration rollers 48 approximately 300° clockwise as shown by the movement arrow thereon in FIG. 3. This rotates the pre-registration gates 52 out of the path of the document, and maintains them out of the path of the document (until they are later rotated back 300° in the opposite direction). The circumference of the rollers 48 for 300° is equal to the desired driving distance of the document 23 into downstream registration gates 56 shown in FIG. 1 plus a slight additional amount to provide a slight buckle of the sheet 23 therebetween. This buckle is sufficient to insure full skew correction and full positive registration of the document lead edge against the actual registration gates 56. This driving distance may, for example, be approximately 11.7 centimeters.

As the document is being driven downstream by the pre-registration rollers 48 up against the spaced pair of registration gate fingers 56 these fingers are in a raised position closely adjacent the surface of the vacuum belt 16. As soon as this final registration is accomplished, closely adjacent registration pinch rollers 54 are automatically raised by the drive 21 to pinch the registered document lead edge against the vacuum belt 16. All subsequent movement of the document is by the subsequent downstream movement of the vacuum belt 16, without any slippage between the document and the vacuum belt 16. The registration gates 56 are automatically lowered by the drive 21 to permit this subsequent feeding of the document over the platen by the vacuum belt 16 before the time for copying of that document occurs. Meanwhile, the pre-registration pinch rollers 48' are lifted to provide unimpeded movement of the document through the nip N. The pre-registration gates 52 are maintained in their position rotated out of the document path at this point in the operation.

In the system disclosed herein, the actuation of the document handling system 11 for the first document requires the actuation of a "start-feeder" switch 61 shown in FIGS. 1 and 3, as well as the proper actuation of the document sensor switches 50 and 51 and the document handling system control circuit 60 to be further described herein. However, it will be appreciated, as noted in the incorporated Caldwell patent that, if desired, the document handling system and copier may be actuated automatically solely through the actuation of the input switch 50 by the document lead edge. Even here, the switch 61 need only be actuated for the first document. The feeding of all of the subsequent document sheets for each document (in the copy run selected by the print-quantity switch 69) initiates the copying of those further documents automatically upon their being fed into proper orientation at the pre-registration gate 52. That is, the lead edge of the subsequent documents provides all of the control actuations for the document handling system, without requiring any separate operator action.

As stated in the incorporated Caldwell U.S. Pat. No. 4,043,665 at cols. 6 and 7, the document is fed through the opened nip of the pre-registration rollers 48 until it abuts, and is stopped by, at least one of the two spaced apart pre-registration gates 52. If the document is not grossly out-of-skew, the switch 50 is then tripped by the lead edge of the document 23 at substantially the same time as the document reaches the gates 52. The switch 50 has its actuating position centrally located in the same area, but slightly upstream of, and intermediate, the gates 52 at a critical position. (Here this is illustrated by the switch line "A" in FIGS. 2 and 3). If the document is fed in with only one side of its lead edge against one gate 52 and excessively skewed to the document path direction (so that the skew can not be subsequently corrected as previously described) or if the document is not close enough to either gates 52 for sufficiently gross pre-registration, then the switch 50 will not be tripped until the operator pushes the document 23 in further and/or with reduced skew. This can be indicated by a light or other operator signal. The tripping of the switch 50 by the central lead edge of the document provides an electrical signal to the machine logic indicating the presence of a document for copying which is within the nip of the pre-registration rollers 48, and which has acceptably gross alignment for skew and registration.

The switches 50 and 51 shown here in FIG. 3 are commercially available solid state photodetector switches. Each contains a light emitter for emitting a beam of light and a receiving section for receiving that light beam and providing a switch signal accordingly. The switches are vertically located to pass their light beam down through the document path at the desired sensing positions. The reflection of the respective light beams back to the switch sensors is provided by respective mirror segments 50a and 51a shown in FIGS. 2 and 3. These may be provided by positioning a mirror under small apertures in the baffle 46 as shown in FIG. 2. The sensing or actuating position of the switches is the position at which the light beam from each switch intersects the paper path. These actuating positions are indicated by line "A" here for the switch 50 and line "B" for the switch 51.

It may be seen particularly from FIG. 3 that the actuating position A of the first switch 50 here is upstream of the stop line S of the pre-registration gates 52 by only approximately 1.8 millimeter (0.072 inch). This spacing of the switching line A upstream from the stop line S has been found to be appropriate for the skew tolerance of this system, where the stop fingers of the pre-registration gates 52 are approximately 15 centimeters apart, and the spacing here between the pre-registration gates 52 and the registration gates 56 is as described above. As noted above, this actuating position A of the first sensor 50 is substantially downstream from the nip line N providing the document driving engagement between the pre-registration rollers 48 and 48', as shown.

The two switches 50 and 51 are here slightly off-set from one another transversely of the document path direction, as shown by their respective mirror positions 50a and 51a in FIG. 2. This is for mounting spacing reasons. It is preferable that the two switches not be laterally off-set by a substantial amount. The sensors are preferably closely adjacent one another, but on opposite sides of the document stop line S in the direction of document movement.

The second sensor 51 actuation position B must be downstream from the stop line S, but its spacing therefrom is not as critical as the upstream spacing of switch 50 actuating position A. However, position B is preferably closely spaced, here by less than 1 centimeter, downstream from position A so as to be substantially simultaneously actuable by a portion of a document undesirably inserted between the two pre-registration gates 52.

The above-described location of the first sensor 50 insures that this sensor will not be actuated by the lead edge of a document until that lead edge is in a position at which the opposite sides thereof will both be caught at the nip line N when the rollers 48' are lowered to pinch the document between both sets of the rollers 48 and 48', i.e., to provide a positive driving pinch in both nips. The allowed initial skew distance of a document edge upstream of one pre-registration gate 52 stop finger before the document handling system is actuated by the switch 50, i.e., before the pinch rollers 48' close and the registration gates 52 open, is approximately 0.64 centimeters (¼ inch) measured at that end of a conventional 28 centimeter (11 inch) long document inserted into the document handling system with its long side as the lead edge in contact with the other pre-registration gate 52 stop fingers. By the sensor 50 being centered between the two stop fingers, and the document being center pre-registered, the same skew tolerance is provided at each stop finger for the document lead edge irrespective of document length.

In FIG. 3 the spacing of the sensors 50 and 51 above the paper path and the spacing of the mirror providing the mirror segments 50a and 51a below the paper path is exaggerated for clarity. Actually the sensors and their respective mirrors are preferably closely spaced above and below the paper path within a few millimeters of one another.

As will be further described herein with reference to FIG. 3, the in-feeding station 20, through the sensors 50 and 51, the DHS control 60, and the drive systems 21 and 38, automatically controls the document handling system 11 in a manner to prevent damage to the document and the occurrence of the jams. The presence or absence of a document at the sensing position A of the switch 50 and the presence or absence of a document at the sensing position B of the switch 51 are both simultaneously sensed. The document handling system is actuated to move the document to the input station only in response to sensing the presence of a document by the switch 50 and sensing the absence of a document by the switch 51. Thus, if the corner of a document is inserted between the two spaced pre-registration gate fingers 52, both sensors 50 and 51 will not be actuated and the document handling system will not start. Likewise, if an irregular or undersized document is inserted into the unit which extends beyond the stop line S, it will interrupt both light beams and the unit will not start. Further, if, as noted above, the document is not sufficiently closely inserted up to the registration gates to trigger the first sensor 50, the document handling system will not start either. Additionally, with the photodiode sensors here, the document handling system will not start if a transparency is inserted instead of an opaque or translucent sheet.

Once the document handling system 11 sensing and logic has been satisfied as described above to start the document handling unit, the second sensor 51 here is utilized as a jam detector. If this sensor 51 is actuated at any improper time, i.e., at any time except when a document should be passing through its sensing position, it will provide a stop signal or inhibiting signal to inhibit the actuation and/or further operation of the document handling system.

To avoid the sensor 51 from shutting down the document handling system during the desired period in which the document is to be fed past the sensor 51, means are provided for disabling the jam detection signal from the sensor 51 and its connecting logic for a pre-determined length of the longest document to be moved through the pre-registration document gate 52, e.g., approximately 27 centimeters. A convenient and desirable disabling system is provided here by a switch 67 directly operated from a cam of the drive 21 which is rotating the pre-registration drive rollers 48. Once this predetermined period allowed for the document to pass the sensor 51 has expired, controlled here by the period of actuation of switch 67, any actuation of the switch 51 by a document at position B thereafter will inhibit the document handling unit from further operation. Specifically, the movement of the pre-registration gates 52 up into the document path is prevented to prevent its stop fingers from damaging the document sensed in the document path at the sensing position B, which is the approximate reentry point of the gates 52 into the document path. Thus, the system operates to hold open, and prevent engagement of a document by, the document gate 52 if any portion of a document remains in the gate at the time when the document gate would normally close, i.e., return to its document stopping position, or thereafter.

As an additional feature, it may be seen that if the operator attempts to feed a second document into the document handling unit while the preceding sheet is in-feeding, i.e., overlapping sheets, the overlapping document normally will not clear the second sensor 51 in the time allowed for the passage of the prior document, and will cause a jam indication and automatic stop as described.

Referring now specifically to FIG. 3, the logic and control system described above preferably at least in part utilizes the programmable general logic circuitry of the copier as described in U.S. Pat. No. 3,936,182, issued Feb. 3, 1976, to Sikander Scheikh. However, the schematic shown in FIG. 3 illustrates in a clear fashion the above-described logic functions, which may be provided in that circuit form, if desired.

As shown in FIG. 3, the document handling system controller 60 here includes a DHS controller 64 with exemplary inputs 64a, 64b, 64c, 64d, and exemplary outputs 64x and 64y. The DHS controller 64 connects at 64b with machine logic indicative of the condition of the machine, i.e., the position of the photoreceptor, the optics system, etc.. This is indicated by the machine coincidence circuit 68. Connected at 64c is the start-feeder switch 61 previously indicated. This and the ready to feed light 63 are also illustrated in FIG. 1. Shown connecting with the machine coincidence circuit 68 is a print quantity selection switch 69 and the diagnostics display 62 (also shown in FIG. 1). The print quantity switch 69 may be the conventional two knob switch on the console of the copier by which the operator selects the number of copies to be made from each document before copying is initiated. This relates, of course, to the operation of the document handling system 11, since if more than one copy cycle occurs for each document at the platen, there will be a corresponding increase in the copying time required, and thus a corresponding delay in the time for initiating the feeding of the next document onto the platen, and, therefore, a corresponding delay between the times at which another document may be accepted at the input station 20.

Exemplary outputs 64x and 64y are to illustrate the connection of the DHS controller 64 to the various components of the document handling system, specifically here the motors 21 and 38. The output 64y is shown connected to the diagnostics display 62 where it may be utilized to provide, during operation, or only when a jam occurs, an indication of the proper document to be copied. For example, where a jam has occurred in the copier and some previously made copies have been lost, this diagnostics display 62 may be utilized to tell the operator which of the previously copied documents to recopy, to "make up" copies, so that a complete copy set output may be maintained. This is referred to as "job recovery."

Referring further to FIG. 3, in the exemplary interconnection of the two sensors 50 and 51 there with the DHS controller 64, it may be seen that the two sensors are shown here connected to the two inputs of a NAND gate 66. This logic gate 66 here provides an output only in response to the interruption (actuation) of the first switch 50 and the non-interruption (non-actuation) of the second switch 51. The output of the logic gate 66 connects through the switch 67 to the DHS controller to provide an input signal 64a indicating that the previously described sensing conditions have been satisfied for the initiation of the document handling system, i.e., the proper insertion of a document. This signal also actuates the "ready to feed light" 63 indicating that a document has been properly inserted.

For the first document, the operator then additionally actuates the start feeder switch 61 in response to seeing the ready to feed light 63 go on. This causes the document handling system 11 to operate. It will grasp the lead edge of the document and pull it into the document handling system, if the machine is otherwise ready. Subsequent documents fed into the document handling system are accepted automatically only at the proper time in the cycle of the machine operation, as indicated by the machine coincidence circuit 68, and not immediately as soon as the sensor 50 has actuated. That is, the ready to feed light 63 may be actuated,, but the document does not actually feed until the proper time for registration feeding of the next document to be copied.

If a subsequent document is not inserted into the input station 20 in time to meet the next copying cycle of the machine, the machine will preferably continue to operate without feeding copy sheets for a brief pre-set time period. For example, the machine may be set to allow two machine cycles to be missed by the next document before the machine automatically cycles out or stops. Thus, the operator has ample time to insert succeeding documents, but after a sufficiently long delay, e.g., approximately 3 seconds, the copier and the document handling unit will stop automatically without requiring any operator intervention.

The switch 67 is illustrated in FIG. 3 as two separate, but commonly actuated switch elements. One connects the output of the NAND gate 66 to the controller through input 64a. The other connects only the second sensor 51 to the DHS controller at the input 64d, and not through gate 66. The input 64d provides a jam detector inhibit or stop signal to the DHS controller in response to the sensing of a document by the second sensor 51, i.e., a jam or misfeed condition, as previously described. As previously described, this input 64d is disabled by the switch 67 during the limited period allowed for the proper in-feeding of a document past the sensor 51.

As a further feature, since any interruption of the light beam of the sensor 51 at any time other than when the switch 67 is opened during the document in-feeding period provides a DHS inhibit, the second sensor 51 is also utilized here to indicate and provide an inhibiting signal to the document handling system upon the lifting of the document handling system unit away from the platen cover at any time. This is accomplished here by the mounting of the sensors 50 and 51 in the pivotal platen cover unit 12 in which the document handling system is mounted, whereas their reflecting mirrors 50a and 51a are mounted in the copier adjacent the platen.

Likewise, if an oversized document is manually placed over the platen while it is open, its blockage of the sensor 51 will prevent initiation of the DHS even if the DHS unit is closed over it.

The document handling system disclosed herein is presently considered to be preferred. However, it is contemplated that numerous further variations and modifications within the purview of those skilled in the art may be made herein. The following claims are intended to cover all such variations and modifications of this invention as fall within its true spirit and scope.

What is claimed is:
1. In a document handling system for a copier in which documents to be copied on a copier platen are moved by a document handling system including a document input station upstream of said platen in the desired direction of document movement comprising a document gate and a document sensing system for automatically controlling said document handling system through control means in response to the entry of documents into said document input station, the improvement in said document input station wherein:
said sensing system comprises a first document sensor actuated by the presence of a document slightly upstream of said document gate, and intermediately thereof, and a second document sensor actuated by the presence of a document downstream of said document gate and intermediately thereof,
said first and second sensors being connected to said control means for initiation of said document handling system for movement of a document through said document gate in response to the actuation of said first sensor and the non-actuation of said second sensor, said first and second sensors also being connected to said control means as inhibiting means for inhibiting the actuation of said document handling system in response to the actuation of said second sensor, and disabling means for disabling said inhibiting means during a limited operating cycle following said initiation of operation of said document handling system for enabling a document of a predetermined length to be moved through said document gate past said sensors by said document handling system without said inhibiting means inhibiting operation of said document handling system, said control means being operative to inhibit further operation of said document handling means in response to the actuation of at least one of said sensors after said limited operating cycle of said disabling means.

2. The document handling system of claim 1, wherein said actuation of said first sensor and said non-actuation of said second sensor operates, through said control means, to open said document gate to document movement therethrough, and wherein said disabling means operates to hold open, and prevent engagement of a document by, said document gate.

3. The document handling system of claim 1, in which said document handling system is removable from said platen, and in which said second sensor is activated by said removal of said document handling system from said platen to inhibit operation of said document handling system.

4. The document handling system of claim 1, wherein said first and second sensors are spaced closely adjacent to one another on opposite sides of said document gate in the direction of document movement so as to be simultaneously actuable by a portion of a document extended through said document gate.

5. The document handling system of claim 1, in which said document gate comprises a transversely spaced pair of document stopping fingers insertable into the path of document movement through said document input station towards said platen to provide a document pre-registration stopping line, and wherein said first sensor is actuated only by the presence of a document closely adjacent both of said fingers, and substantially aligned with said stopping line, and wherein said first and second sensors are positioned centrally between said fingers and sufficiently closely spaced on opposite sides of said document stopping line for substantially simultaneous actuation by a portion of a document projected between said spaced fingers beyond said document stopping line in the direction of document movement.

6. The document handling system of claim 1, wherein said document handling system operation may be initiated only upon said actuation of said first sensor and said non-actuation of said second sensor, and wherein actuation of said second sensor inhibits operation of said document handling system at all times other than during said limited operating cycle of said disabling means.

7. The document handling system of claim 1, wherein both said first and second sensor comprise photo-detector switches which are actuated only by the interruption of a light beam through said document path at said actuation positions of said first and second sensors.

8. The document handling system of claim 1, wherein said document input station further includes document drive means actuated by said control means, said document drive means having a document engagement position slightly upstream from said document gate in said direction of document movement, and wherein said first sensor is actuated by a document between said document engagement position of said document drive means and said pre-registration gate in the direction of document movement so that a document sensed by said first sensing means will be engaged by said document drive means upon said initiation of operation of said document handling system.

9. The document handling system of claim 1, wherein said disabling means comprises switch means between said second sensor and said control means activated with the movement of said pre-registration gate.

10. In a copying apparatus wherein documents are moved over a copying station by a document handling system which moves documents in a feeding direction from a document input station towards said copying station, the improvement comprising;

first sensing means for sensing the presence or absence of a document at a first sensing position in said document input station;

second sensing means for sensing the presence or absence of a document at a second sensing position downstream from said first sensing position in said direction of movement of said document toward said imaging station from said document input station;

control means for actuating said document handling system to move said document toward said imaging station past both said first and second sensing positions within a limited pre-set period in response to sensing of the presence of a document at said first sensing position and sensing the absence of a document at said sensing position; inhibiting means for inhibiting said document handling system to prevent movement of a document toward said imaging station from said document input station in response to sensing the presence of a document at at least one of said sensing stations, except during said limited pre-set period subsequent to the actuation of said document handling within which said document is being moved past said sensing positions towards said imaging station; and, gate means for stopping a document from reaching said second sensing position until said document handling system is actuated at a position between said first and second sensing positions, closely adjacent said first sensing position in said direction of document movement toward said imaging station.

11. The copying apparatus of claim 10 wherein said gate means stops a document at two spaced stop locations spaced at opposite sides of said first and second sensing positions transverse said direction of document movement.

12. In a document handling system for a copier in which documents to be copied on a copier platen are moved by a document handling system including a document input station upstream of the platen in the desired direction of document movement comprising a document pre-registration gate for pre-registering and skew orienting documents by stopping them with a pair of spaced stop fingers prior to their being fed onto the platen, and a document sensing system for automatically controlling said document handling system through control means in response to placement of a document into said document input station, the improvement in said document input station wherein:

said sensing system comprises a first document sensor positioned slightly upstream of said pre-registration gate, and centrally between said stop fingers, and a second document sensor positioned downstream of said pre-registration gate, intermediately of said stop fingers, to be actuated by a portion of a document extending between said stop fingers, said first and second sensors being individually actuated by the presence of a document at said respective individual positions of said first and second sensors, said control means initiating operation of said document handling system, including opening said pre-registration gate, only in response to the actuation of said first sensor and the non-actuation of said second sensor, said control means being connected to stop said document handling system in response to any actuation of said second sensor at any time except during a limited operating cycle following the actuation of said document handling system pre-selected to enable a document of a pre-determined length to be moved past said second sensor by said document handling system.

13. In a method of copying wherein documents are moved over a copying station by a document handling system which moves documents in a feeding direction from a document input station towards said copying station, the improvement comprising the steps of;

sensing the presence or absence of a document at a first sensing position in said document input station;

sensing the presence or absence of a document at a second sensing position downstream from said first sensing position in said direction of movement of said document toward said imaging station from said document input station;

actuating said document handling system to move said document toward said imaging station past both said first and second sensing positions within a limited pre-set period in response to sensing of the presence of a document at said first sensing positions and sensing the absence of a document at said second sensing position;

inhibiting said document handling system to prevent movement of a document toward said imaging station from said document input station in response to sensing the presence of at at least one of said first and second sensing stations, except during said limited pre-set period subsequent to the actuation of said document handling system within which said document is being moved past said sensing positions towards said imaging station, said document being stopped from reaching said second sensing position until said document handling system is actuated at a position between said first and second sensing positions, closely adjacent said first sensing position in said direction of document movement toward said imaging station and, wherein a document is stopped at two spaced stop locations spaced at opposite sides of said first and second sensing positions transverse said direction of document movement.

* * * * *